United States Patent
Zell

(10) Patent No.: US 10,054,110 B2
(45) Date of Patent: Aug. 21, 2018

(54) METHOD FOR OPTICALLY DETECTING A WIND TURBINE FOR TESTING PURPOSES USING AN AIRCRAFT

(71) Applicant: HGZ Patentvermarktungs GmbH, Mülheim (DE)

(72) Inventor: Horst Zell, Mülheim (DE)

(73) Assignee: HGZ Patentvermarktungs GmbH, Mülheim (DE)

( * ) Notice: Subject to any disclaimer, the term of this patent is extended or adjusted under 35 U.S.C. 154(b) by 51 days.

(21) Appl. No.: 15/100,903

(22) PCT Filed: Dec. 1, 2014

(86) PCT No.: PCT/EP2014/076114
§ 371 (c)(1),
(2) Date: Jun. 1, 2016

(87) PCT Pub. No.: WO2015/082405
PCT Pub. Date: Jun. 11, 2015

(65) Prior Publication Data
US 2016/0305406 A1 Oct. 20, 2016

(30) Foreign Application Priority Data
Dec. 2, 2013 (DE) .................. 10 2013 113 326

(51) Int. Cl.
*G01J 5/04* (2006.01)
*F03D 17/00* (2016.01)
(Continued)

(52) U.S. Cl.
CPC .............. *F03D 17/00* (2016.05); *B64C 27/04* (2013.01); *B64C 39/024* (2013.01); *B64D 47/08* (2013.01);
(Continued)

(58) Field of Classification Search
CPC .......... G01J 5/047; F03D 11/00; F03D 17/00; B64C 27/04; B64D 47/08; F02C 9/00;
(Continued)

(56) References Cited

U.S. PATENT DOCUMENTS

2010/0103260 A1 4/2010 Williams
2012/0136630 A1 5/2012 Murphy
(Continued)

FOREIGN PATENT DOCUMENTS

DE 102008053928 A1 5/2010
DE 102011118833 B3 1/2013
(Continued)

OTHER PUBLICATIONS

English translation of the International Preliminary Report on Patentability corresponding the PCT/EP2014/076114, dated Jun. 7, 2016.

(Continued)

*Primary Examiner* — Marcus Taningco
*Assistant Examiner* — Mindy Vu
(74) *Attorney, Agent, or Firm* — Kilpatrick Townsend & Stockton

(57) ABSTRACT

A method for optically acquiring a wind turbine for monitoring purposes with the aid of an aircraft, in particular a manned or unmanned rotorcraft, which has at least one camera installed thereon, wherein the wind turbine comprises a plurality of rotor blades, the surface of which is scanned within the scope of the method.

7 Claims, 3 Drawing Sheets

(51) Int. Cl.
  *B64C 27/04* (2006.01)
  *B64D 47/08* (2006.01)
  *B64C 39/02* (2006.01)

(52) U.S. Cl.
  CPC ......... *G01J 5/047* (2013.01); *B64C 2201/024* (2013.01); *B64C 2201/123* (2013.01); *F05B 2240/2211* (2013.01); *F05B 2260/83* (2013.01)

(58) Field of Classification Search
  CPC ............ F05D 2260/80; F05D 2240/20; F05D 2270/114; F01D 21/003
  See application file for complete search history.

(56) References Cited

U.S. PATENT DOCUMENTS

2013/0114088 A1* 5/2013 Newman .................. G01B 9/02
  356/520
2014/0168420 A1* 6/2014 Naderhirn ........... G01M 5/0016
  348/128

FOREIGN PATENT DOCUMENTS

EP         2527649 A1    11/2012
WO    2011/113402 A1     9/2011

OTHER PUBLICATIONS

English translation of the Search Report corresponding the PCT/EP2014/076114.

* cited by examiner

METHOD FOR OPTICALLY DETECTING A WIND TURBINE FOR TESTING PURPOSES USING AN AIRCRAFT

The invention relates to a method for optically acquiring a wind turbine for monitoring purposes with the aid of an aircraft, in particular a registered aircraft or aircraft requiring licensing, preferably a manned rotorcraft, in particular a helicopter, or an unmanned aircraft (e.g. UAV, unpiloted aerial vehicle), in particular an unmanned rotorcraft. In the process, the wind turbine should remain in its completely assembled state.

WO 2011/113402 A1 describes a method for testing the structural state of wind turbines, in which the rotor blades of a wind turbine are flown over in succession and acquired optically by way of a helicopter. The recorded images, in particular thermal images, are subsequently examined in respect of possible damage to the rotor blade.

Figure 1:
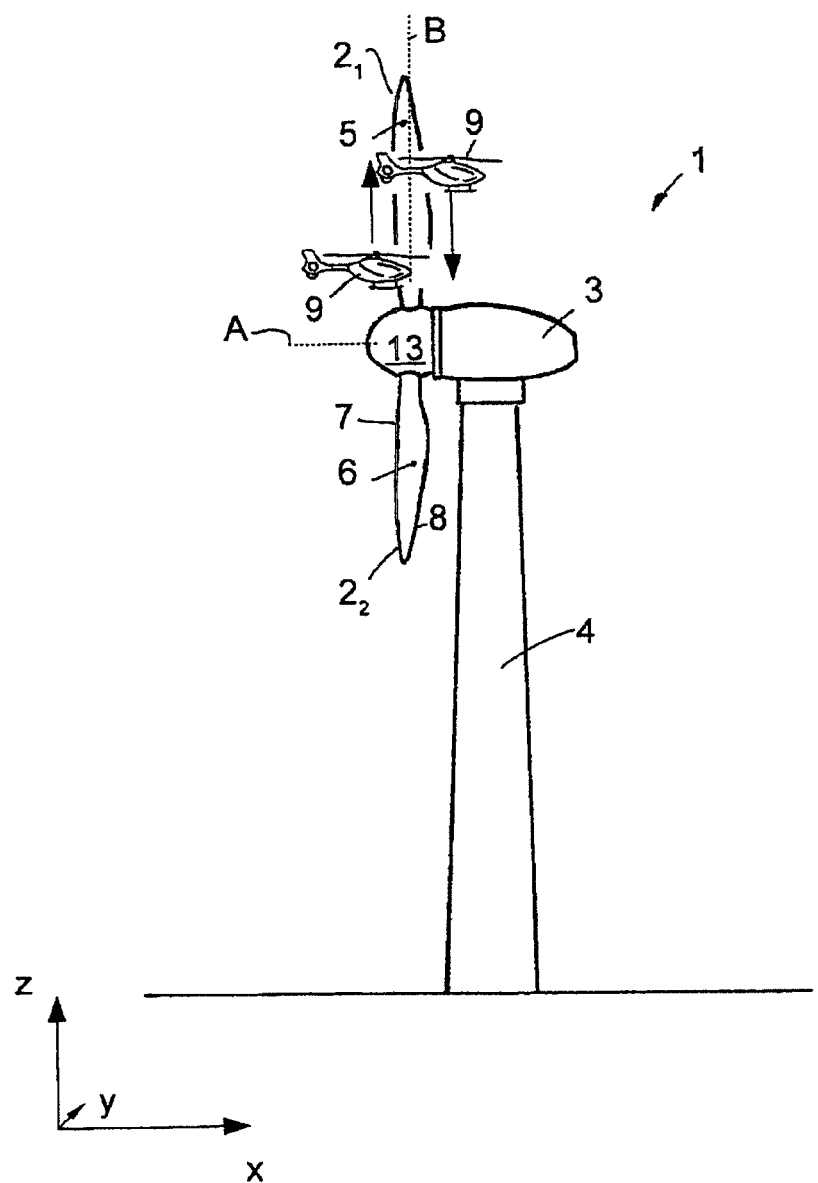

However, it was found that circumstances which make the implementation more difficult, particularly in the case of relatively large wind turbines, are present in the case of the practical implementation of this testing method. This is because development is currently focused on wind turbines which have a rotor diameter of approximately 170 m, with an end of the increase in size not yet being foreseeable. A rotor diameter of 170 m at the same time means a rotor blade length of approximately 85 m. FIG. 1 of WO 2011/113402 A1 shows that the helicopter stands substantially frontally in front of the whole wind turbine. It appears as if the wind turbine could be completely acquired in a single recording. However, in the case of a rotor diameter of approximately 170 m, a relatively large distance would be required to be able to optically acquire the wind turbine or the rotor blade in the entirety thereof by way of a single recording. However, the resolution of current cameras would not be sufficient in that case to uncover even small or very small damage with dimensions of at most 1 or 2 mm.

In this respect, the helicopter not exceeding a certain maximum distance from the rotor blade is unavoidable, in turn making it necessary for the individual images to be put together again by way of a so-called stitching method. This is where the problems start, as it is necessary to record a multiplicity of individual images, with the helicopter having to assume a certain position in relation to the rotor blade for the recordings to be usable. However, a cost problem also arises at the same time, since the operating hours of a helicopter are relatively expensive and an optimization of the use of the helicopter is therefore required.

The invention now proposes to carry out a method for optically acquiring a wind turbine for monitoring purposes with the aid of the aircraft set forth at the outset, with a camera, in particular a thermal imaging camera, preferably a specially cooled shortwave thermal imaging camera, being installed on said aircraft. The wind turbine comprises a plurality of rotor blades, the surface of which is scanned within the scope of the method. Scanning is carried out optically, in particular by means of the thermal imaging camera. The method comprises the following method steps: aligning a first rotor blade in a vertical position, subsequently flying over and scanning a first side of the first rotor blade in the vertical direction, subsequently flying over and scanning a second side of the first rotor blade in the vertical direction. The first and second side in each case means the compression side or the tension side of the rotor blade, it being unimportant which side thereof is detected first. Subsequently, there is an alignment of a second rotor blade in a vertical position. Subsequently, there is flying over and scanning a first side of the second rotor blade in the vertical direction and subsequently there is flying over and scanning a second side of the second rotor blade in the vertical direction. Here, the alignment in a vertical direction means that a rotor blade axis of the rotor blade is aligned vertically, in particular pointing vertically upward from the hub. The rotor blade axis should not be mistaken for the rotor axis. The rotor axis is the axis aligned substantially horizontally, which is defined by the position of the nacelle of the wind turbine and runs centrally through the hub. Then, the rotor blade axes are aligned across this rotor axis and rotate about the rotor axis. The blade adjustment can be carried out by twisting the rotor blade about the rotor blade axis.

The energy of light beams, in particular thermal beams, which are incident on the rotor blades from the outside, are substantially subdivided into three components:

Reflection: incident components are reflected. Reflected light beams have no significance for damage in the interior of the rotor blade, but rather falsify the significance of the thermal image recording.

Absorption: incident components are absorbed by the surface and destroyed.

Transmission: incident components penetrate through the surface and can reach inner parts of the rotor blade or completely pass through the rotor blade.

In particular the component of the transmission is of particular importance for assessing the rotor blades since the local heating can be measured at inner parts of the rotor blade, as a result of which inner damage can be made identifiable. This is of particular importance in the case of such applications if the thermal flux is applied onto the rotor blade in a targeted manner from the outside or from the inside in order to establish local heating in a targeted manner. The component of the transmission is then at its maximum if such thermal radiation is incident as perpendicular as possible onto the surface of the rotor blade.

Thus, it was found that recordings from unsuitable locations have little significance or no significance at all. An angle between the surface to be scanned and the recording direction that is too flat may cause falsifying reflections. Thus, the publication "Thermographic inspection of rotor blades" by Peter Meinlschmidt and Jochen Aderhold from 2006 records thermal imaging records of an assembled wind turbine from the ground; the recordings obtained in this manner are useless as a result of the steep recording angle since the reflections are too large and at best only a very small portion of the received light waves in fact originates from the interior of the rotor blade.

The core of the invention therefore, in particular, lies in initially aligning the rotor blade vertically and, subsequently, flying over and optically scanning both sides of the rotor blade in the vertical direction. This procedure is advantageous, in particular, if use is made of a rotorcraft—either manned or unmanned—as an aircraft. Thus, flying over the rotor blades is merely controlled by collective blade adjustment of all rotor blades of the rotorcraft, which usually enables relatively uniform rising or sinking of the rotorcraft. In contrast thereto, a rotor blade aligned at an angle would also require a horizontal movement component of the rotorcraft, which is difficult to control. In particular, flying over at an angle is relatively difficult to carry out for the pilot, in particular under the stipulation of a flight which is as uniform and smooth as possible. Acquiring a horizontally aligned rotor blade would moreover make it necessary to fly toward this rotor blade from the rear side, i.e. the tower side, as well. However, this is undesirable since the tower impedes an approach of the rotorcraft. Alternatively, the rotor blade could be placed in such a way in the case of a horizontal alignment that it could be approached from below or above. However, photographs would have to be taken through the rotor of the helicopter in that case (in the case of an approach from below); moreover, the camera would have to be aligned downwards by another step so as to acquire the other side, which either requires two different cameras or would necessitate swiveling of the camera. Hence, the alternatives to the vertical alignment are all linked with significant disadvantages which become obsolete by the vertical alignment.

Thus, in the alignment proposed according to the invention, it is possible to acquire both sides of the rotor blade by initially flying over the one rotor blade and subsequently directly flying over the other rotor blade, without a time-consuming rearrangement of the rotor blade or the camera being necessary. Subsequently, the next rotor blade is brought into the alignment pointing vertically upwards and flown over and optically acquired in the process. Overall, it is possible in this way to realize a cost-saving (flight time reducing) and, at the same time, high-quality optical acquisition of the wind turbines.

Preferably, the rotor blade is flown over from both sides and scanned at a steep recording angle of approximately 80° to 100°, at most 75° to 105°. Such an angle is preferred because the portion of the transmission of possibly emitted measurement beams, e.g. infrared beams, is optimized on regions of the surface. Furthermore, recording angles from 55° to 125° are acceptable. The recording angle very close to 90°, referred to below, can be excluded in these angle ranges.

This is because if an angle which is too flat emerges between the recording direction and the surface of the rotor blade to be scanned, in particular an angle of more than 35° (recording angle less than 65° or greater than 125°), a large portion of these measurement beams will bounce off the surface (reflection) and will not penetrate the material. In the case of very flat angles, the surface only still appears as a large mirror as the ambient light is reflected. In this respect, it is necessary to scan the surfaces from the position that is as perpendicular as possible.

The use of a recording angle very close to 90° can lead to reflection effects, in particular when use is made of a thermal imaging camera. In this respect, a recording angle of at most 88° or at least 92°, preferably of at most 85° or at least 95°, more preferably of at most 80° or at least 100° may be preferred. The angle ranges specified further above can be combined with these angle ranges.

Preferably, the compression side and the tension side of the rotor blade, i.e. substantially the two large faces of the rotor blade, are aligned therefor substantially in a plane spanned by the tower and the rotor axis of the wind turbine. Essentially, this is the plane in which the rotor blade axis then also lies. In particular, with the rear edge thereof, the rotor blade is then aligned in the direction of the tower while the front edge of said blade is then aligned away from the tower.

By contrast, if another alignment of the rotor blade were to be selected, in which e.g. the tension side or the compression side of the rotor blade would be aligned toward the tower, the aircraft would once again come too close to the tower as it would require a flight trajectory in a vertical plane arranged behind the tower (from the view of the rotor blade) in that case. By contrast, provision is now made according to the invention for the helicopter now being able to fly substantially parallel to the tower on the left and on the right, without the tower in this case constituting a flight trajectory impediment.

Preferably, provision is made for the regions on the rotor surface to be detected to be scanned at least twice, wherein. The aircraft is arranged in different positions in relation to the rotor blade in each one of the two scans. Alternatively, the aircraft could also have two spaced apart cameras such that the required recordings, in particular a type of stereo image, are generated during a single position of the aircraft. Here, it is the recording angle in particular that is varied in relation to the other, preceding recording. Here, the recording angle is defined by the angle of the recording direction in relation to the plane which is spanned by the surface in the region of the rotor blade to be acquired. In principle, this angle should lie as perpendicular as possible at approximately 90° in relation to the rotor blade surface in order to generate as few falsifications as possible as a result of the reflection. In this case, angle deviations of at most 15°, preferably approximately 10°, lend themselves to being used for the variation. In this respect, an ideal acquisition is given in the case of a recording angle of between approximately 80° and 100°. This is achieved, in particular, by virtue of the aircraft assuming a vertical flight trajectory during the second flying over of the same side which is offset in the longitudinal direction in comparison with the previous flight trajectory. The longitudinal direction is substantially defined by the rotor axis. Here, each side is therefore preferably flown over twice, once in a vertically upward manner and once in a vertically downward manner. Now, the recording angles are different from one another in both cases. Therefore, it is possible to filter out reflection effects. This is because a thermal image artifact, which indicates damage, needs to be equally identifiable in both recordings. Thermal image artifacts which are identified in both recordings but are present in different positions in each case indicate air eddies which can likewise be reflected in the thermal images. Such thermal eddies are generally caused by wind or the aircraft itself, in particular by the rotorcraft. Furthermore, the exhaust gas jet can cause a thermal image artifact. Then, such "incorrect" artifacts cannot be identified in the second recording.

A multiplicity of partial recordings of the rotor blade are generated during the method. By means of stitching, these partial recordings can be combined to form an overall image. Here, stitching is understood to mean, in particular, the creation of a large image from a plurality of smaller images; this is carried out manually or, preferably, in an automated manner by way of a computer program.

In order to accelerate the optical acquisition of the wind turbine, provision is preferably made for a control command to be generated, in particular in an automated manner, after flying over the second side of the first rotor blade, on the basis of which control command the alignment of the second rotor blade into the vertical position is initiated. In particular, such a control command can be established by way of a data connection between the helicopter and the control unit of the wind turbine. A simple form can lie in the generation and transmission of a short message by way of SMS or email, which is sent to the control unit of the wind turbine. It is also possible to use an Internet connection via mobile communications or a different wireless connection by way of maritime radio or a satellite connection. By way of example, the elevation of the aircraft can be used automatically. As result of flying over the vertical flight trajectories twice, once in the upward direction and once in the downward direction, it is possible to identify that the entire rotor blade has been flown over. Then, bringing the second rotor blade into the vertical position is initiated on the basis of such a control command.

Preferably, a distance, in particular a horizontal distance, between the wind turbine and the aircraft is monitored in an automated manner. It is necessary to assume an ideal distance for the ideal evaluation of the images. Firstly, the wind turbine should be acquired with as much detail as possible, requiring a relatively close distance; secondly, the safety of the aircraft should be ensured, requiring a certain minimum distance. This monitoring of the distance now helps to ensure both in this case, namely the quality of the recordings and the flight safety. Monitoring can be carried out by means of a laser rangefinder. If the actual distance deviates from a predetermined intended distance, it is possible to output a warning signal which signals the deviation to the pilot. Also, in general terms, a distance measurement may form an input signal for an autopilot which automatically flies over a predetermined flight trajectory within the scope of the method according to the invention.

In particular, the invention is applicable in the case of wind turbines comprising an uneven number of rotor blades, in particular comprising at least three rotor blades. In the case of such rotor blades at least one rotor blade is always in a position which is difficult to be flown over by an aircraft, in particular by a rotorcraft. Such wind turbines can be monitored as efficiently as possible by the claimed procedure.

Figure 2:
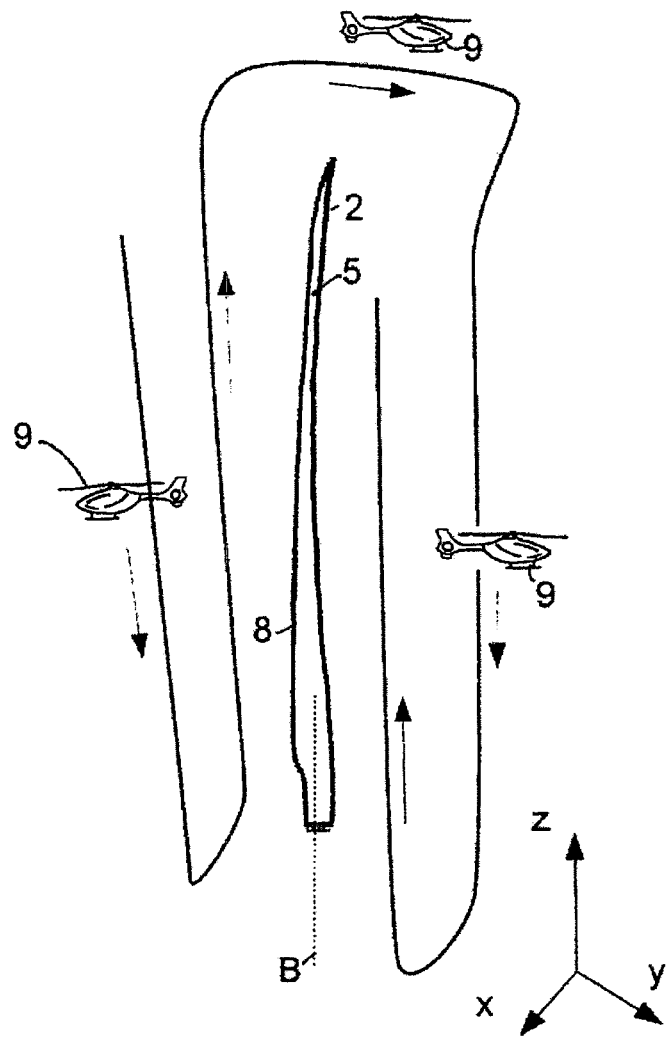
Figure 3:
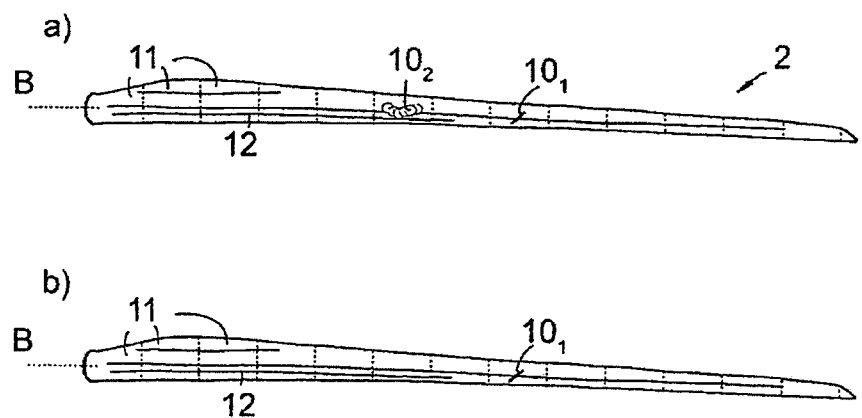
Figure 4:
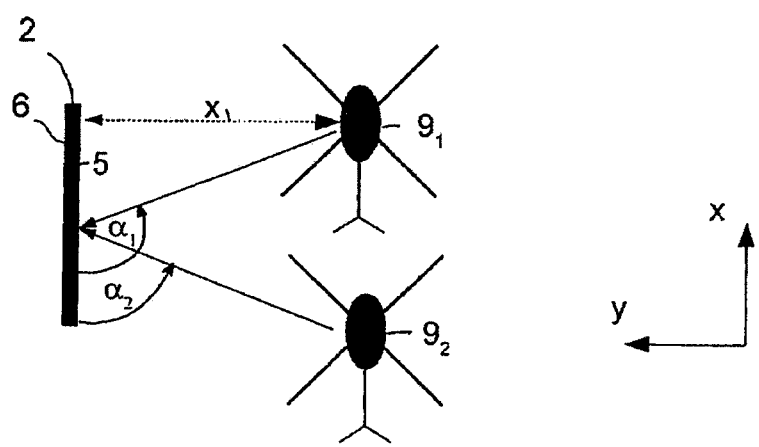

The invention will be explained in more detail below on the basis of the figures, in which FIG. 1 shows a wind turbine which is flown over and detected in a thermographic manner by a helicopter;

FIG. 2 schematically shows the flight trajectory of the helicopter during the flying-over procedure;

FIG. 3 schematically shows the thermal image of a rotor blade acquired optically, a) with an artifact caused by helicopter, b) without an artifact caused by helicopter;

FIG. 4 schematically shows the alignment of the helicopter while flying over the rotor blade from above.

FIG. 1 shows a known wind turbine 1 with a tower 4 and a nacelle 3. A plurality of rotor blades 2, of which only two can be identified, are fastened to a hub 13. Usually, three rotor blades are present. The rotor, which comprises the rotor blades 2 and the hub 13, rotates about the rotor axis A, which is aligned substantially horizontally and which can be rotated about a vertical axis, which is defined by the tower 4, depending on the position of the nacelle. The rotor blades 2, in turn, can be twisted in relation to the hub 13 about the rotor blade axis B. For inspection purposes, a first rotor blade $2_1$ is now aligned vertically such that the rotor blade axis B thereof points vertically upward. Now, a helicopter 9, on which a thermal imaging camera is installed, flies over both the compression side 5 and the tension side 6 of the rotor blade 2 in succession. Here, flying over in a vertically downward direction and flying over in a vertically upward direction are provided in each case.

More details in respect of the flight trajectory emerge from FIG. 2. It is possible to identify the rotor blade 2 with the tension side 5 thereof. Initially, the helicopter 9 positions itself at a position approximately level with the blade tip and then it flies vertically downward in the direction of the hub in a manner approximately parallel to the rotor blade axis B. Then, it displaces its position in the x-direction such that the rotor blade can be observed from the helicopter from a slightly different angular position. Then, the helicopter flies vertically upward again. During the process of flying over, the camera records a multiplicity of thermal images. Subsequently, the helicopter 9 switches the side of the rotor blade and flies from the tension side to the compression side 5. There, it likewise initially flies over the rotor blade from top to bottom in the vertical direction, subsequently changing the longitudinal position x and flying to the top again. Once it has reached the top again, it can assume a type of parked position; the higher, the better. Then, a signal is transmitted to a control unit of the wind turbine, for example by way of radio waves or SMS, with the request now to bring the next rotor blade into the position pointing vertically upward. Then, the next rotor blade is acquired and flown over in the manner described above, until all rotor blades have been flown over and optically acquired.

FIG. 3 shows the thermal image of a rotor blade 2, which is composed from a multiplicity of individual recordings 11 by stitching, carried out either by hand or in an automated manner. However, the recordings according to FIG. 3a were recorded from a different lateral position than the recording according to FIG. 3b. Thus, a first thermal image artifact $10_1$ can be identified in FIG. 3a, which artifact can also be identified in the recording according to FIG. 3b. The first thermal image artifacts $10_1$ are respectively arranged at the same positions in both images, despite a deviating recording position. In this respect, the assumption can be made that these thermal image artifacts $10_1$ indicate cracks in the shown rotor blade 2. Furthermore, it is also possible to identify support structures 12, both in the illustration according to FIG. 3a and in the illustration according to FIG. 3b. Furthermore, a second thermal image artifact $10_2$ can be identified in FIG. 3a. However, it cannot be identified in the illustration according to FIG. 3b. Since it cannot be identified in the second illustration, it consequently does not indicate damage. It turns out that this is the thermal image of an exhaust gas flow of the helicopter.

FIG. 4 shows the alignment of the helicopter 9 while flying over the rotor blade in different longitudinal positions. Initially, the helicopter $9_1$ flies over the rotor blade 2 (depicted in a simplified manner in a horizontal cross section not true to scale) in such a way that a recording angle $\alpha_1$ of approximately 100° emerges. At the second time, the helicopter $9_2$ flies over the rotor blade 2 in such a way that a recording angle $\alpha_2$ of approximately 80° emerges.

A distance x between the helicopter 9 and the rotor blade 2 is established continuously by means of a laser rangefinder not depicted in any more detail here. If the helicopter should come too close to the rotor blade, a safety warning which warns the pilot about a possible collision is output (e.g. acoustically or optically). If the distance x becomes too big, this can reduce the significance of the generated images. This is also signaled to the pilot by means of a warning signal.

REFERENCE SIGNS

1 Wind turbine
2 Rotor blade
3 Nacelle
4 Tower
5 Tension side
6 Compression side
7 Front edge
8 Rear edge
9 Helicopter
10 Artifact
11 Individual recording
12 Support structure 13 Hub
A Rotor axis
B Rotor blade axis
α Recording angle
x Horizontal distance

The invention claimed is:

1. A method for optically acquiring a wind turbine for monitoring purposes with the aid of an aircraft which has at least one camera installed thereon, wherein the wind turbine comprises a plurality of rotor blades, the surface of which is scanned within the scope of the method, wherein the scanning is carried out optically, comprising the following method steps:
   aligning a first rotor blade in a vertical position,
   subsequently flying over and scanning a first side of the first rotor blade in the vertical direction,
   subsequently flying over and scanning a second side of the first rotor blade in the vertical direction,
   subsequently aligning a second rotor blade in a vertical position,
   subsequently flying over and scanning a first side of the second rotor blade in the vertical direction,
   subsequently flying over and scanning a second side of the second rotor blade in the vertical direction,
   wherein a control command is generated in an automated manner after flying over the second side of the first rotor blade, on the basis of which control command the alignment of the second rotor blade into the vertical position is initiated.

2. The method as claimed in claim 1, wherein a rotor blade axis of the rotor blade to be scanned is aligned pointing vertically upward during the scanning.

3. The method as claimed in claim 1, wherein the rotor blade to be scanned is aligned in such a way that a compression side and at tension side of the rotor blade lie substantially parallel to a plane which is spanned by the tower a rotary axis of the wind turbine.

4. The method as claimed in claim 1, wherein the regions to be detected on the rotor surface are scanned at least twice, wherein the camera or cameras and/or the aircraft are arranged at different positions in relation to the rotor blade at each one of the two scans.

5. The method as claimed in claim 1, wherein the flying over the side of the rotor blades during the scanning is initially carried out in one vertical direction and subsequently carried out in the opposite vertical direction.

6. The method as claimed in claim 1, wherein a multiplicity of partial recordings of the rotor blade are generated, said partial recordings being combined to an overall recording.

7. The method as claimed in claim 1, wherein a distance between the wind turbine or the rotor blade and the aircraft is monitored in an automated manner.

* * * * *